United States Patent Office 3,509,803
Patented May 5, 1970

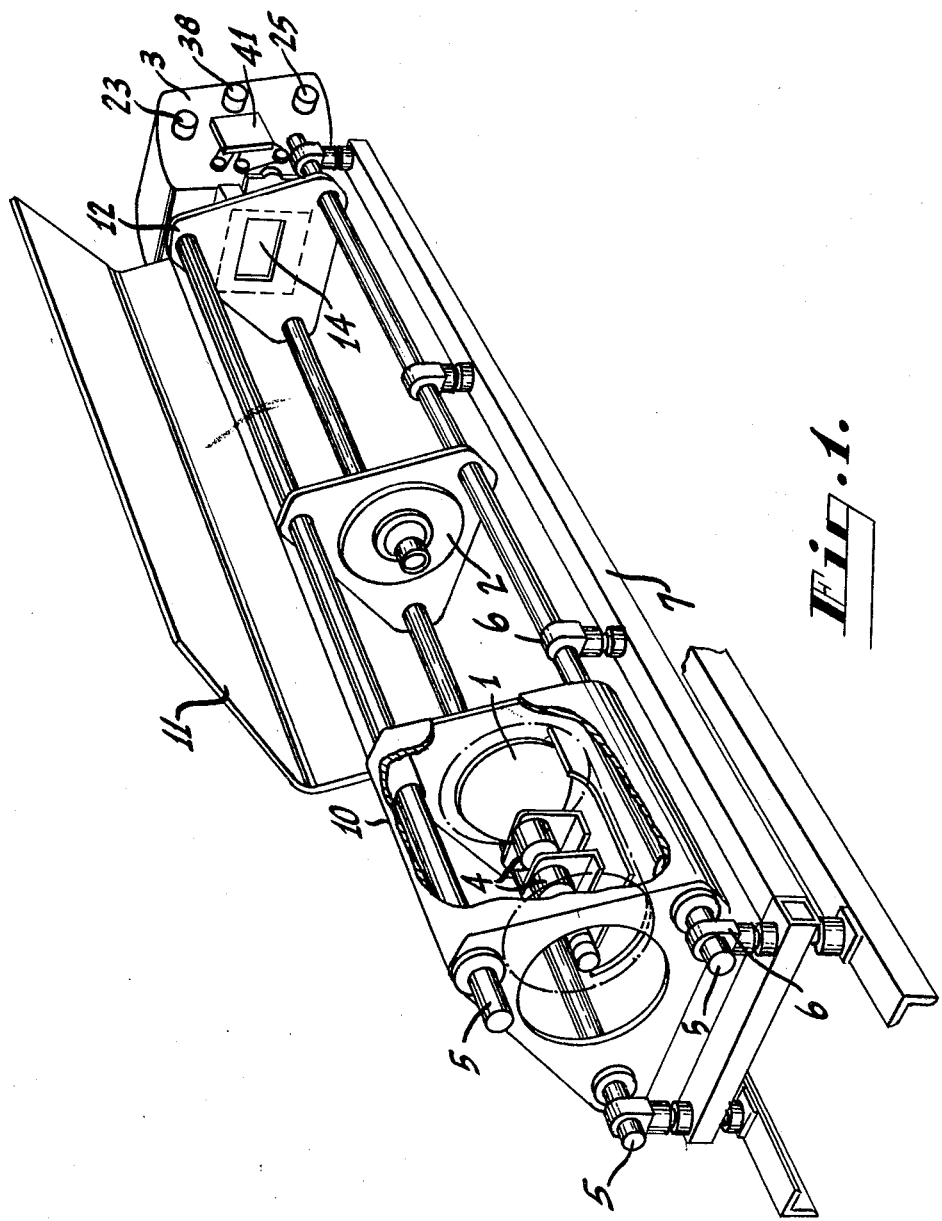

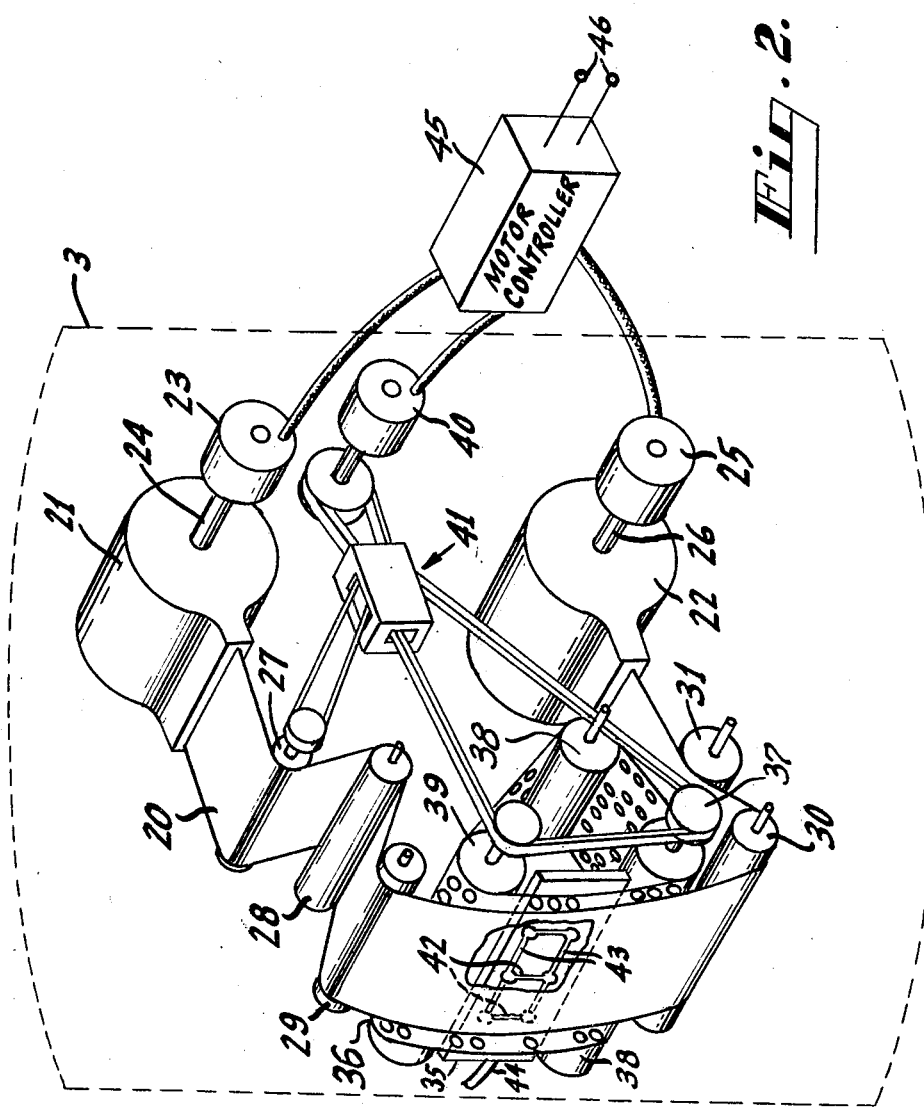

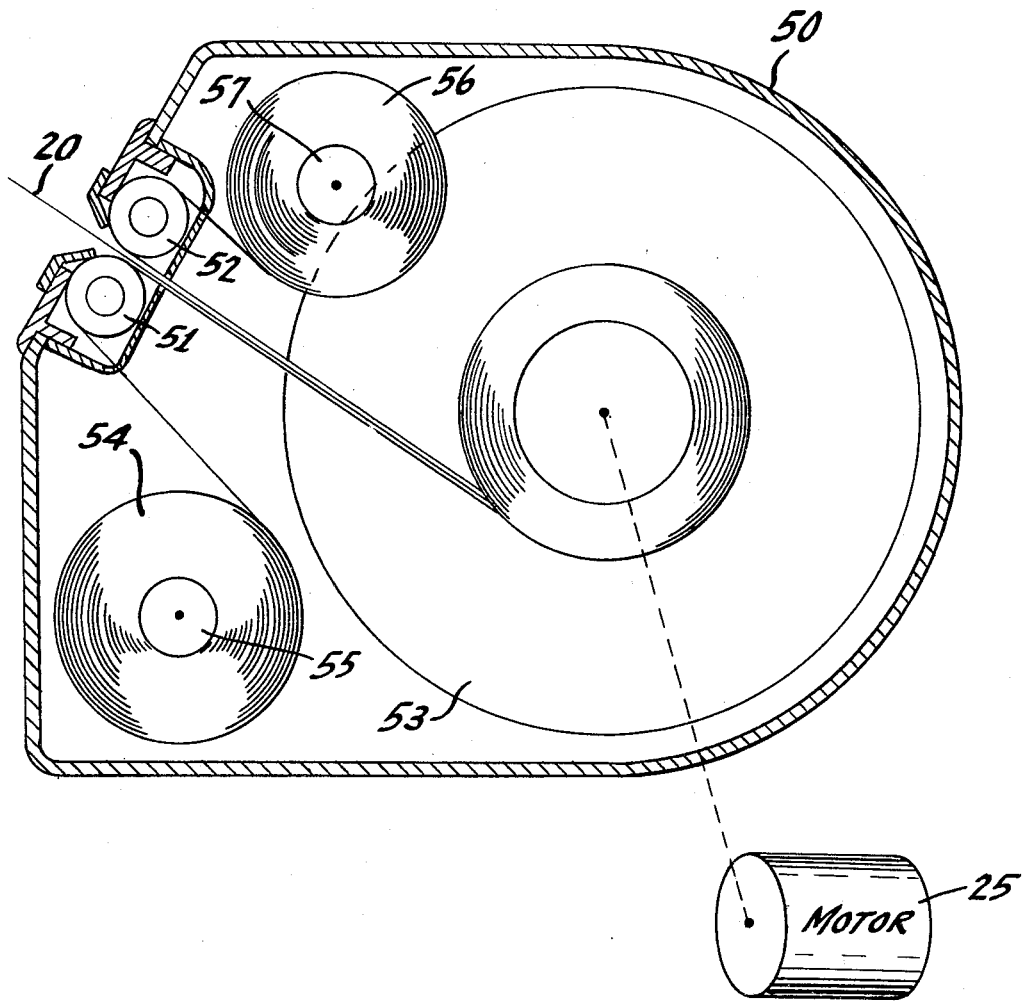

3,509,803
PHOTOCOMPOSING APPARATUS
James F. Delany, Cinnaminson, N.J., assignor to RCA Corporation, a corporation of Delaware
Filed Oct. 11, 1966, Ser. No. 585,911
Int. Cl. B41b 21/32
U.S. Cl. 95—4.5
1 Claim

ABSTRACT OF THE DISCLOSURE

Photocomposing apparatus for recording on film graphic images that are created on an imaging device. The apparatus includes a perforated belt that is driven over a vacuum plate to draw the film into intimate contact with the belt so as to drive the film between the supply reel and the take-up reel. There is also provided first and second rolls of protective tape that are arranged to be driven in intimate contact with the film so as to provide protective layers for the film.

---

In the field of high speed printing, one of the problems in the conventional photocomposing systems has been to accelerate the speed of composing the characters comprising the desired printed document. The cathode ray tube offers a means for rapidly displaying a succession of characters across its face. However, in order to record this displayed information for printing purposes, a recording medium must be precisely transported and positioned to allow the recorded characters to form an integrated document record suitable for preparing a conventional printing roller or plate.

An object of the present invention is to provide an improved photocomposing apparatus.

Another object of the present invention is to provide an improved camera apparatus for precisely transporting a recording medium.

Still another object of the present invention is to provide an improved photocomposing apparatus having a novel camera for precisely transporting and positioning a recording medium.

A further object of the present invention is to provide a novel cassette for storing and protecting the recording medium used with the present invention.

In accomplishing these and other objects, there has been provided, in accordance with the present invention, an electro-optical photocomposing apparatus having a character display source, such as a cathode ray tube and a recording camera for recording successive displays projected by the display source tube. The camera includes storage means for a recording member and transport means for transporting and positioning the recording member to store the character displays. A vacuum holding means comprising a rigid plate having vacuum distributing apertures and a moving perforated belt are provided beneath the recording member to precisely position the recording member while allowing motion thereof.

A better understanding of the present invention may be had when the following detailed description is read in connection with the accompanying drawings, in which:

FIG. 1 Is a pictorial illustration of a photocomposing apparatus using the present invention;

FIG. 2 is a pictorial illustration of a novel camera mechanism for use with the apparatus shown in FIG. 1; and FIG. 3 is a pictorial representation in cross-sectional form of a novel cassette suitable for use with the present invention.

Referring to FIG. 1 in more detail, there is shown a photocomposing apparatus having a cathode ray tube display source 1, an optical lens unit 2, and a camera 3. The cathode ray tube 1, or CRT, has associated with it suitable focusing and deflection means 4 for selectively positioning an image on the face thereof. The CRT 1, lens 2 and camera 3 are mounted on a rigid structure comprising three tubular bars 5 arranged in a triangulated relationship. The lens assembly 2 is slidably mounted and operative to focus the CRT image on a recording medium, e.g., photographic film, within the camera 3, which may, also, be slidably mounted on the bars 5. Two of the bars 5, in turn, are shock-mounted on shock absorbing mounts 6 suitably located between a lower pair of the bars 5 and a support frame 7.

A light-tight enclosure 10 having a hinged cover 11 aranged to provide access to the lens package 2 is provided for the photocomposer assembly to exclude ambient light from the camera 3. The camera 3 is suitably mounted by hinge means (not shown) to form a light-tight seal with a fixed end plate 12 of the enclosure 10. The end plate 12 is provided with an aperture 14 to expose the recording film within the camera 3 to the images presented by the CRT 1 and lens 2.

In operation, the CRT 1 is driven by any suitable means to produce sequential images across the face thereof representative of the characters to be recorded, i.e., photocomposed, on the film in the camera 3. The film, subsequently, is driven to present a new recording surface for each successive character frame presented by the CRT 1. This frame may be either one character, a line of characters, or a plurality of lines of characters.

In FIG. 2, there is shown a pictorial illustration of a novel camera mechanism suitable for use with the apparatus of FIG. 1. This illustration has been simplified by the removal of the light-tight enclosure surrounding the internal mechanism in order to clearly present these internal elements. A film 20 is driven between a supply cassette 21 and a take-up cassette 22 with its emulsion surface facing the aperture 14. The cassettes 21 and 22 are provided with internal rollers for suporting the film 20 in a reeled state. A first motor means 23 is arranged to supply a tensioning, or dragging, torque on the roller in the supply cassette 21 along a connecting shaft 24. On the other hand, the roller in the take-up cassette is rotatably driven by a motor means 25 via a connecting shaft 26.

The film 20 is disposed on a plurality of supporting rollers 27, 28, 29, 30 and 31 during its travel between the cassettes 21 and 22. Additionally, a support plate 35 is provided beneath the film 20 adjacent to the aperture 14. A perforated seamless belt 36 is disposed between the plate 35 and the film 20. This belt 36 may advantageously be made of any suitable material having linear stability combined with flexibility, e.g., Mylar. The belt 36 is supported on a plurality of rollers 37, 38 and 39 with two of the rollers, e.g., rollers 38 and 39 being driven by a stepping motor 40 via a suitable connecting means 41. Additionally, one of the film support rollers, e.g., roller 27, may be concurrently driven to expedite the movement of the film 20.

The support plate 35 is provided with a plurality of holes 42 and interconnecting channels 43 on its surface adjacent to the perforated belt 36. The holes 42 are connected to a common chamber (not shown) on the rear of the plate 35. This chamber is connected to a vacuum source by a hose 44. The motors 23, 25 and 40 are controlled by any suitable motor control means shown in block diagram form as motor controller 45. A pair of input terminals 46 are provided to selectively control the motion of the film 20. It is to be noted that the motors 23, 25 and 40 may be reversible motors if it is desired to reposition the film 20 before the CRT 1 as in a recording operation involving successive recordings on different portions within a frame on the film 20.

The camera 3 is arranged to present a new recording surface after storing the projected characters from the CRT 1 comprising a frame of information. The stepping motor 40 is driven in successive increments by the controller means 45 concurrently with the display of characters on the face of the CRT 1. In order to insure the stability of positioning of the film 20, a vacuum is applied by means of the hose 44, the holes 42 and channels 43 to the underside of the belt 36. This vacuum is communicated to the non-emulsion side of the film 20 via the perforations in the belt 36 and is effective to securely grip the belt 36 and the film 20 against the adjacent surface of the plate 35. This surface is disposed parallel to the aperture 14 and is essentially a flat surface with exception of the holes 42 and channels 43 which constitute a very minor portion of its surface.

The film 20, accordingly, is tensioned by the motors 23 and 25 and is incrementally stepped across the plate 35 by motion of the belt 36 driven by the motor 40 which belt prevents the film 20 from being erratically dragged across the plate 35 and enables sprocketless film to be used. Thus, the surface of the film 20 adjacent to the aperture 14 is maintained in a flat tensioned state in order to provide a precise recording capability for the successive character frames.

In FIG. 3, there is shown a cross-sectional view of a film cassette suitable for use as the take-up cassette 22 shown in FIG. 2. The recording medium 20 is arranged to enter the cassette 50 between a pair of guide rollers 51, 52. The film 20 is reeled onto a storage reel 53 driven by the previously discussed motor 25. A first roll of a protective web 54 is carried on a spindle 55 within the cassette 50. The web 54 is arranged to pass over the roller 51 whereby it is brought into contact with the recording surface of the film 20 and is rolled onto the reel 53 along with the film 20. The web 54 is effective to protect the film 20 from any irregularities on the surface of the roller 51 and to separate the layers of the film 20 on the reel 53. A second roll of a protective web 56 may be mounted within the cassette 50 on a second spindle 57. This second web 56 is arranged to pass between the second roller 52 and the film 20 to provide a further protection for the film 20 and to restrain short pieces of the film 20. The second roll 56 is positioned within the reel 53 while the spindle 57 would be arranged to clear the periphery of the reel 53. Thus, as the film 20 was being stored on the reel 53, the diameter of the second roll 56 would be continuously decreased to accommodate the increasing diameter of the film 20 in the reel 53.

Accordingly, it may be seen that there has been provided in accordance with the present invention, an electro-optical photocomposing apparatus having a novel camera means for precisely positioning and transporting a recording medium.

What is claimed is:
1. Photocomposing apparatus for recording graphic images on photographic film,
   comprising in combination,
   an imaging device for creating graphic images for recording on said film,
   film supply means positioned to supply said film to said imaging device,
   film take-up means including a storage reel positioned to take up and store said film after said graphic images are stored thereon,
   drive means coupled to drive said film between said film supply means and said film take-up means,
   said drive means including,
      a vacuum plate having interconnecting channels on one surface thereof and adapted to be connected to a vacuum source,
      a perforated web in contact with said surface and positioned to support said film,
      a motor coupled to drive said perforated web over said surface so as to move said film when said motor is activated, and
   means providing first and second rolls of protective tape arranged intermediate said supply means and said take-up means to be driven in intimate contact with said film so as to provide protective layers for said film.

References Cited

UNITED STATES PATENTS

| | | | |
|---|---|---|---|
| 2,950,663 | 8/1960 | Warshawsky | 95—31 |
| 3,057,529 | 10/1962 | Fitch | 226—95 |
| 3,087,399 | 4/1963 | Fairbank | 95—31 |
| 3,321,121 | 5/1967 | Nyberg et al. | 226—95 |
| 3,355,166 | 11/1967 | Plumb | 226—95 |
| 3,111,598 | 11/1963 | Tatham | 313—86 |
| 3,139,810 | 7/1964 | Tobin | 95—89 |
| 3,183,806 | 5/1965 | O'Brien | 95—4.5 |
| 3,256,797 | 6/1966 | Horne | 95—85 |

JOHN M. HORAN, Primary Examiner

U.S. Cl. X.R.

95—31